United States Patent [19]

Gardner

[11] Patent Number: 4,808,652

[45] Date of Patent: Feb. 28, 1989

[54] CROSSLINKER COMPOSITIONS COMPRISING AMINO RESINS, EPOXIES AND STYRENE ALLYL ALCOHOL COPOLYMERS

[75] Inventor: Kenneth J. Gardner, Springfield, Mass.

[73] Assignee: Monsanto Company, St. Louis, Mo.

[21] Appl. No.: 203,978

[22] Filed: Jun. 8, 1988

[51] Int. Cl.$^4$ ............... C08L 63/02; C08K 5/05
[52] U.S. Cl. .................... 524/376; 523/454; 523/455; 523/456; 524/315; 524/365; 524/379; 525/110; 525/510
[58] Field of Search ......... 525/110; 523/456, 400, 523/454, 455; 524/376, 315, 365, 379

[56] References Cited

U.S. PATENT DOCUMENTS

| | | | |
|---|---|---|---|
| 4,018,848 | 4/1977 | Khanna | 260/834 |
| 4,243,705 | 1/1981 | Yapp | 427/386 |
| 4,517,327 | 5/1985 | Heaps | 524/315 |
| 4,554,319 | 11/1985 | Heaps | 525/155 |
| 4,596,843 | 6/1986 | Wind | 523/416 |
| 4,661,568 | 4/1987 | Koenig et al. | 525/510 |

Primary Examiner—Theodore E. Pertilla
Attorney, Agent, or Firm—R. Bruce Blance; William J. Farrington

[57] ABSTRACT

Crosslinker compositions comprising an etherified amino resin, a styrene allyl alcohol copolymer and an epoxy resin. The crosslinker compositions are used to cure hydroxy functional coating vehicles to provide cured coatings resistant to staining.

14 Claims, No Drawings

CROSSLINKER COMPOSITIONS COMPRISING AMINO RESINS, EPOXIES AND STYRENE ALLYL ALCOHOL COPOLYMERS

This invention relates to crosslinker compositions for hydroxy functional vehicles and more particularly it relates to crosslinker compositions comprising etherified amine resins, epoxy resins and styrene allyl alcohol copolymers.

Crosslinker compositions for hydroxy functional vehicles comprising etherified amino resins and styrene allyl alcohol copolymers are known in the coatings art. However such crosslinker compositions when used with hydroxy functional vehicles give coatings which are deficient in stain resistance, corrosion resistance and flexibility. Crosslinker compositions comprising etherified amino resins and epoxy resins can cure hydroxy functional vehicles to provide coatings with adequate flexibility and adhesion but the cured compositions lack stain resistance which is necessary for coated coil stock used in fabrication of metal appliances and furniture. I have now found that crosslinker compositions containing etherified methylolmelamines, epoxy resins and styrene allyl alcohol copolymers cure hydroxy functional vehicles to provide coil coatings with satisfactory flexibility, adhesion, corrosion resistance and stain resistance.

One aspect of this invention is the crosslinking composition comprising from about 40 to about 70 parts by weight of an etherified amino resin, from about 15 to about 40 parts by weight of an epoxy resin and from about 5 to about 20 parts by weight of a styrene allyl alcohol copolymer, wherein the amino resin is added to a solution of styrene allyl alcohol copolymer the epoxy resin is then added and the mixture is heated to a temperature in the range of 60° to 120° C. until a clear solution is obtained.

Another aspect is a method of preparing such crosslinking compositions in which the styrene allyl alcohol copolymer is dissolved in a polar solvent, the etherified amino resin is added followed by the epoxy resin and the mixture is heated for a short time at an elevated temperature until a clear solution has formed.

THE AMINO RESIN

As used in this description the term "etherified amino resin" refers to any of the large number of alkoxylated amino resins which are commonly employed in the art of surface coatings. Such amino resins are characterized as being soluble in common solvents as distinguished from amino resins of the thermosetting type which are employed in molding or casting compositions. The aminoplasts which are suitable for the purpose of this invention are the alkoxymethyl derivatives of urea and of polyamino triazines selected from the group consisting of melamine, acetoquanamine, adipoguanamine and benzoguanamine.

The alkoxymethylureas can be prepared in the conventional manner by reaction of urea and formaldehyde under alkaline conditions followed by etherification with a $C_1$ to $C_4$ alcohol under acid conditions to provide a condensate with an average degree of condensation of about 3 or less and a urea:formaldehyde:alcohol ratio in the range of about 1:2–3:1–2.5. Preferably the ratio is in the range of about 1:2.2–2.8:1.3–2.2 and the ratio of formaldehyde:alcohol is at least about 1.1.

The alkoxymethylaminotriazines are substantially completely methylolated polyaminotriazines substantially fully etherified with alcohol. They can be prepared by reaction of the polyaminotriazine with formaldehyde to methylolate the amino groups and are then alkylated or etherified by reaction with alcohol. The etherified methylolated aminotriazines are liquid and are essentially monomeric or at most are oligomeric with an average degree of polymerization of no more than about 3, the aminotriazine rings being joined by methylene or methylene ether bridges formed by condensation of two methylol groups. Thus, the etherified aminotriazines within the scope of the invention possess a ratio of aminotriazine to combined formaldehyde in the range of about $1:2n-0.5$ to about $1:2n$ where n is the number of amino groups per triazine ring and possess a ratio of aminotriazine to alkyl ether groups in the range of about $1:2n-1$ to about $1:2n$. The preferred aminotriazine is melamine since it has three amino groups per ring and is potentially hexafunctional. Thus, the more preferred aminotriazine compounds are the alkoxymethyl melamines in which the ratio of melamine to combined formaldehyde is in the range of 1:5.5 to 1:6 and the ratio of melamine to alkoxy groups is in the range of 1:5 to 1:6. The alcohols suitable for etherification of the methylol melamine are branched or straight chain alkyl alcohols. A mixture of alcohols such as methanol and butanol or methanol and isobutyl alcohol (2-methyl-1-propanol) can be used for the etherification to make a mixed etherified aminoplast. Preferred mixed ethers are methoxy/butoxy and methoxy/isobutoxy ethers. The range of the ratio of methoxy/butoxy or isobutoxy can vary widely. A preferred range is from about 2:1 to about 1:2. A single alkyl alcohol can also be used for etherification. For such an application, the preferred alcohol is methanol. Among the more preferred aminotriazine compounds is substantially monomeric hexamethoxymethyl melamine.

THE EPOXY RESIN

The epoxy resins suitable for use in the present invention are viscous liquids of molecular weight in the range of 140 to 3000 and contain two or more epoxy groups per molecule. They include polyglycidyl compounds made by condensation reactions of bisphenols such as bisphenol A and bisphenol F with epichlorohydrin, polyglycidyl derivatives of phenolformaldehyde novolaks, polyglycidyl derivatives of polyamines, polyglycidamides of triazine compounds and the epoxy resins prepared by epoxidation of dienes and polyenes such as vinylcyclohexene, cyclohexadiene, dicyclopentenyl ether and dicyclohexenyl ether. The preferred epoxy resins are bisphenol A epichlorohydrin epoxy resins having an epoxy equivalent of 1100 or less. It is preferred that the epoxy equivalent be about 400 or less to provide high solids coating compositions.

The crosslinker composition can contain an accelerator for the reaction between epoxy and hydroxy functional groups. Typical examples of such accelerators are the stannous salts of monocarboxylic acids such as stannous octoate and heterocyclic compounds such as imidazoles and benzimidazoles and salts thereof.

STYRENE(METH-)ALCOHOL COPOLYMER

The styrene alcohol copolymers used in the preparation of the new compositions of the invention comprise copolymers of styrene and allyl alcohol or methallyl alcohol. The molecular weight of the copolymers is in the range of about 800 to about 2500 and the hydroxy content is in the range of about 4.0 to about 10.0 weight percent and more preferably in the range of about 5.0 to about 8.0 weight percent.

The solvent used for preparing the crosslinker composition can be any one or a mixture of solvents. Advantageously polar solvents of solubility parameter in the range of about 8.0 to about 15 $(cal/cm^3)^{0.5}$ and fractional polarity in the range of about 0.07 to about 0.7 as set forth in the Encyclopedia of Polymer Science and Technology, Wiley, 1965, Vol. 3, pp 838–841, such as alcohols, ketones, ethers, glycol ethers and acetates are used. Among the alcohols are those having from 1 to 5 carbon atoms per molecule including methyl, ethyl, propyl, butyl and amyl alcohols. In addition to alcohols, ketones, such as acetone, methyl ethyl ketone, methyl isobutyl ketone and methyl amyl ketone can be used. Examples of suitable acetates are ethyl, butyl and propyl acetate. Examples of suitable glycol ethers are methyl cellosolve, cellosolve and butyl cellosolve. A preferred solvent is ethanol and mixtures thereof with other alcohols, ethers and ketones. Another preferred solvent is butyl cellosolve.

In preparing the crosslinker compositions, it has been found advantageous to dissolve the styrene alcohol copolymer in an adequate amount of solvent at an elevated temperature limited by the boiling point of the solvent. With butyl cellosolve, a temperature in the range of 100° to 110° C. has been found to be suitable. The solution is cooled and the amino resin is added while the temperature drops to a temperature in the range of 20° to 40° C. The epoxy resin is then added and the mixture is heated for a short time at an elevated temperature in the range of 60° to 120° C. until a clear solution is obtained. With butyl cellosolve as solvent, the temperature is advantageously maintained in the range of 80° to 100° C. for about 10 to 30 minutes to obtain a uniform solution which is then cooled to room temperature. The resultant solution is stable and can be subjected to freeze-thaw cycles without phase separation.

Varying amounts of solvent can be used to form the crosslinking composition. Generally, at least 3 weight % solvent is needed. Less than 3% will yield a solution that is too viscous. It is preferred that the amount of solvent used be in the range of 4 to 20 weight % of the total solids. Preferably the amount of solvent used is sufficient to provide a solution viscosity determined in the selected solvent at room temperature of less than about 5000 cps to facilitate the dispersion of the solution in the solution of hydroxy functional resin.

THE HYDROXY FUNCTIONAL VEHICLE

The hydroxy functional vehicle which is used with the crosslinking composition of the present invention can be one of a number of commercially available resins. Advantageously the hydroxy containing resin should have a hydroxy content of from about 1.3 weight percent to about 10 weight percent, preferably about 2.0 to 6.0 weight percent. Hydroxy content is defined as the weight percent of hydroxy groups per 100 parts of solid hydroxy containing resin. Thus resin having one equivalent of hydroxy groups per 100 parts of resin would have a weight percent hydroxy content of 17/100 or 17 percent. Advantageously the hydroxy-containing resin has an acid number of at least about 2 and preferably in the range of about 6 to about 12 and may be stabilized in aqueous dispersion by neutralization with ammonia or with a volatile amine or with a hydroxyamine such as dimethylethanolamine.

Examples of suitable hydroxy containing resins are acrylic, alkyd and polyester resins as are described below.

THE ACRYLIC RESINS

The acrylic resin which can be used with the crosslinking composition of the present invention is any of a number of commercially available acrylic resins. The acrylic resin is a polymer of at least one ester of an alpha-olefinic monocarboxylic acid having the general formula:

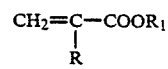

wherein R is either hydrogen or a lower alkyl group of from 1 to 4 carbon atoms, and $R_1$ represents an alkyl, hydroxy alkyl or cycloalkyl group of from 1 to 18 carbon atoms, and may include one or more of the comonomers of the formula:

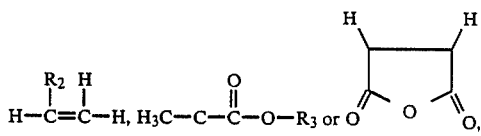

wherein $R_2$ is H, $CH_3$ or $C_6H_5$; and $R_3$ is alkene of 2 or 3 carbon atoms.

Examples of esters of alpha-olefinic monocarboxylic acids which may be used in the present invention include methyl acrylate, ethyl acrylate, propyl acrylate, isopropyl acrylate, butyl acrylate, hexyl acrylate, octyl acrylate, 2-ethylhexyl acrylate, cyclohexyl acrylate, decyl acrylate, stearyl acrylate, methyl methacrylate, methyl alpha-ethyl acrylate, ethyl methacrylate, butyl methacrylate, butyl alpha-ethyl acrylate, hydroxypropyl acrylate and lauryl methacrylate.

Examples of the comonomers which may be used in the acrylics of the present invention are phenyl allyl alcohol, glycidyl methacrylate, styrene, α-methyl styrene, acrylic acid, methacrylic acid, acrylonitrile, maleic anhydride, allyl acrylate, vinyl acrylate, allyl acetate and vinyl acetate.

THE ALKYD RESINS

The alkyd resins which can be used with the crosslinking composition of this invention include those types normally used in baking or air drying applications. These resins can contain up to about 45 weight percent of an oil or fatty acid. When the fatty acid or oil concentration is increased above the 45 weight percent level, cure response is diminished and the resulting films are soft and subject to mar and solvent attack. However, alkyd resins can be prepared which contain no fatty compound and are based upon polyols and polyacids only. These alkyd resins or oil-less alkyds are especially useful for exterior applications and have a high degree of flexibility, adhesion, ad possess unique elongation properties. Preferably, though, the fatty compound should be present in an amount equal to about 20 to about 45 weight percent of the total alkyd resin solids with the most preferable range being about 35 to 45 weight percent.

In addition the particular alkyd resin which is chosen should have a solids acid value of at least 2. Lower acid value alkyds exhibit poor cure response and film resistance properties. Preferably the acid value of the selected alkyd should be in the 6 to 12 acid value range, however, alkyds with an acid value as high as 30 can also be employed with only minor stability problems.

When a fatty compound is present in the alkyd resins of this invention, it can comprise any of the fatty acids or oils ordinarily used in preparing alkyd resins. Included are the following oils and their respectively derived fatty acids: tall, safflower, tung, tallow, soya, corn, linseed, poppyseed, castor, dehydrated castor, perilla, coconut, oiticica, and the like. Of special usefulness are those fatty compounds wherein the fatty acid portion contains from 12 to 24 carbon atoms per molecule.

An additional component of the alkyd resins of this invention is a polyol or a mixture of polyols. Among the polyols which can be utilized are those normally used in producing alkyd resins including pentaerythritol, glycerine, trimethyolpropane, trimethyolethane and the various glycols such as neopentyl, ethylene and propylene glycols. Preferable among the above types of polyols are triols or mixtures containing a major amount of a triol and a minor amount of tetra-alcohol.

Typical of the carboxylic acids in addition to the aforementioned fatty acids incorporated into the alkyd resins are phthalic anhydride, isophthalic acid, adipic acid, azelaic acid, benzoic acid, etc. These acids can readily be replaced by any of the additional acids normally used in alkyd resin processing. The preferred system in addition to including the aforementioned preferred levels of a fatty compound contains an aromatic dibasic acid or a mixture of such aromatic acid with an aliphatic dibasic acid.

THE POLYESTER RESIN

The polyester which can be used with the crosslinking composition of this invention may be saturated, unsaturated or oil-modified such as those polyesters well known in the surface coating art. Polyesters are prepared by reacting a polyhydric alcohol (polyol) and a polybasic acid.

Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerythritol, sorbitol, mannitol, methyl glycoside, 2,2-bis(hydroxyethoxyphenyl) propane, 2,2-bis (beta-hydroxypropoxyphenyl) propane and the like. Mono-functiona alcohols may also be employed to supplement the other polyols and to control the molecular weight. Useful alcohols include those having a hydrocarbon chain comprising from about 3 to about 18 carbon atoms.

The acid component of suoh polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized in addition to the above-mentioned acids include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example, phthalic acid, tetrahydrophthalic acid, hexahydrophthalic acid, endomethylenetetrahydrophthalic anhydride, tetrachlorophthalic anhydride, hexachloroendomethylene tetrahydrophthalic acid, and the like. The term acid as used in this specification includes the corresponding anhydrides, where such anhydrides exist.

In many instances it is optional to include a fatty acid. These include saturated fatty acids such as decanoic, dodecanoic, tetradecanoic, hexadecanoic, octadecanoic, docosanoic, and the like. And in addition, unsaturated fatty acids may be used such as 9-octadecenoic, 9,12-octadecadienoic, 9,12,15-octadecatrienoic, 9,11,13-octadecatrienoic, 4-keto-9,11,13-octadecatrienoic, 12-hydroxy-9-octadecenoic, 13-docosenoic, and the like.

THE COATING COMPOSITIONS

The coating compositions comprising hydroxy functional vehicle and the crosslinker composition of the present invention generally comprise from about 50 to about 90 weight percent of vehicle and about 50 to 10 percent of crosslinker composition. Advantageously to provide a desired level of hardness and stain resistance in the cured coating, the amount of styrene allyl alcohol copolymer in the coating composition is selected in the range of about 1 to about 10 weight percent based on the total binder solids of the composition.

Solutions of adequate viscosity for coating applications, advantageously have total solids from 30 to 80 weight %. The preferred range is 40 to 70%.

In order to achieve low temperature curing using the coating compositions, an acid catalyst can be used. Included are catalysts such as para-toluenesulfonic acid, dodecylbenzene sulfonic acid, methanesulfonic acid, dinonylnaphthalene disulfonic acid, butyl acid phosphate, hydrochloric acid, and other organic and mineral acids having at least one active hydrogen group per molecule. Preferred among these cataysts are the sulfonic acids. Catalyst concentration can range from about 0.25 to about 6% based on the total weight of the final coating depending upon the final end use. Thus when the coating is to be employed as a wood sealer as low as 0.25 to 1.0% catalyst can be employed. On the other hand when the coating is to be used as a topcoat more complete cure is required and therefore from 2 to 6 weight percent catalyst may be used. It should be noted that since most of the above acid catalysts are crystalline at room temperature, solutions at about 50% solids in methanol or another solvent having a boiling point of less than about 162° C. may be used to facilitate handling.

The coating composition may be colored with any of the pigments usually employed for coloring of such coating compositions such as an organic pigment, carbon black, titanium dioxide, and aluminum flake.

The coating composition may also have incorporated therein other additives such as wetting agents, conditioning agents, flow control agents, ultraviolet stabilizers, promoters for crosslinking and antioxidants.

The application of the coating composition to a substrate may be executed by a conventional method. That is, the composition may be applied by brushing, roller coating, spraying with compressed air or with a petroleum solvent of low boiling point or electrostatic spraying.

The coating composition may be applied to a variety of materials such as wood, paper, paper board, glass, metal, stone, plastics and cloth.

Practical and presently preferred embodiments of the present invention are shown for illustration in the following Examples wherein parts and percentages are by weight unless otherwise indicated.

TEST METHODS

Solvent resistance is measured by rubbing the coating with felt tip pen soaked with methyl ethyl ketone.

Gloss is measured at 60° according to ASTM-D573. Results are given in percent (%).

Cleveland Condensing Humidity Test is carried out according to ASTM D-2247-68 using a Cleveland Condensing Humidity Cabinet at 63° C.

Pencil hardness is measured according to ASTM D3363-74. Results are given in the scale 6B, 5B, 4B, 2B, B, HB, F, H, 2H to 9H going from softest to hardest.

Impact is measured according to ASTM G14-72. Results are given in joules (J).

T-bend flexibility is measured according to the National Coil Coaters Association, standard T-bend test method; Technical Bulletin II-19. 1T more flexible; 3T less flexible.

Stain resistance is measured by applying a yellow mustard to the coating surface.

EXAMPLE 1

This example describes the preparation of a crosslinker composition of the present invention.

A reactor, equipped with stirrer and heating jacket, is charged with 1285 parts by weight of a styrene allyl alcohol copolymer containing about 70 weight percent styrene and 30 weight percent allyl alcohol, of number average molecular weight about 1700. One thousand parts by weight of butyl cellosolve is added and the mixture is heated to 110° C. until the styrene allyl alcohol copolymer has dissolved. While the batch is being cooled to about 40° C., 5143 parts by weight of a methoxymethylmelamine with a combined ratio of melamine, formaldehyde and methanol of 1:5.85:5.1 and a degree of polymerization of 1.2 is added and at 40° C., 2572 parts of an epoxy resin sold by Shell Chemical Company under the trademark EPON 1001F, possessing an epoxy equivalent of about 500, is added in such a way as to minimize clumping and the batch is stirred to form a uniform mixture. The reactor is then heated to 90° C., and held at this temperature for 20 minutes until the mixture forms a clear solution which is then cooled to room temperature.

EXAMPLE 2

This example describes the preparation of a crosslinker composition of the present invention.

The composition is similar to the composition of Example 1 except that a methoxymethylmelamine with a combined ratio of melamine, formaldehyde and methanol of 1:5.2:3.3 is used. The process of Example 1 is followed in the preparation of this example.

EXAMPLE 3

This example describes the preparation of a coating composition comprising a hydroxy functional polyester and the crosslinking composition of Example 1.

8333 parts by weight of a 60 weight percent solution of a hydroxy functional polyester solution sold by Freeman Chemical Corporation under the tradename Chempol II-3820, of hydroxyl number 175 and equivalent weight 320 is diluted with 533 parts by weight of an aromatic hydrocarbon solvent of boiling point 150° C. and 100 parts by weight of a salt of a fatty acid amide welting agent is added and mixed in. Ten thousand parts by weight of titanium dioxide pigment is added and the mixture is ground to a fineness of 7.0-7.5 Hegman in a Cowles mixer. The dispersion is drained from the mill and the residue is washed out with a solution of 1667 parts of the polyester solution and 200 parts of the aromatic hydrocarbon solvent followed by 200 parts of aromatic hydrocarbon solvent. The dispersion and washings are mixed.

In a separate container 3333 parts by weight of polyester solution, 50 parts by weight of a flow control agent sold by Monsanto under the trademark Multiflow, 750 parts of 2,4-dimethylcyclohexanone, 750 parts of propylene glycol monomethyl ether acetate, and 2000 parts of aromatic hydrocarbon solvent of boiling point 100° C. are mixed to provide a homogeneous solution and the ground dispersion is slowly mixed in.

A solution of the crosslinker composition of Example 1 (2000 parts by weight solids) is diluted with 200 parts of butanol, 55 parts of dinonylnaphthalene disulfonic acid is added and the solution is stirred and then mixed with the polyester titanium dioxide dispersion. The pigmented coating composition is applied to test panels in the manner described hereinbelow.

EXAMPLE 4

This example is a coating composition comprising the hydroxy functional polyester of Example 3 and the crosslinking composition of Example 2, prepared by the method described in Example 3 using the same quantities of ingredients.

EXAMPLES 5 AND 6

Similar coating compositions to Examples 3 and 4 are prepared with a hydroxy polyester of hydroxyl number 52, sold by Guardsman Chemicals, Inc. under the tradename RX-0314 as a 70 weight percent solution in xylene.

EXAMPLES 7 AND 8

Similar coating compositions to Examples 3 and 4 are prepared with a hydroxy polyester of 60 weight percent solids in aromatic hydrocarbon solvent, sold by American Cyanamid under the tradename Cyplex 1531.

The coating compositions of Examples 3-8 are applied to steel coating panels and dried under conditions to give a peak metal temperature of 230° C., a dwell time of 30 seconds and a dry film thickness of 23 to 25 microns. The coatings are evaluated for gloss, flexibility, pencil hardness, solvent resistance and stain resistance. Comparison of the cured coating compositions with cured compositions containing no styrene allyl alcohol copolymer and/or epoxy resin showed that the coating compositions containing the crosslinking compositions of the present invention are at least equivalent in gloss, flexibility, pencil hardness and solvent resistance and are superior in stain resistance. Data for stain resistance are presented in Table 1.

TABLE 1
STAIN RESISTANCE OF CURED
PIGMENTED COATING COMPOSITIONS
Vehicle: crosslinker composition, 80:20.
Pigment (TiO$_2$): binder, 1:1.

| Example | Polyester | Melamine Resin | SAA Copolymer | Epoxy Resin | Mustard Stain (1-10 rating; 1 worst, 10 best) |
|---|---|---|---|---|---|
| 3 | | | | | 10 |

TABLE 1-continued
STAIN RESISTANCE OF CURED PIGMENTED COATING COMPOSITIONS
Vehicle: crosslinker composition, 80:20.
Pigment (TiO$_2$): binder, 1:1

| Example | Polyester | Melamine Resin | SAA Copolymer | Epoxy Resin | Mustard Stain (1–10 rating; 1 worst, 10 best) |
|---|---|---|---|---|---|
| C3-1 |  |  | — | — | 5 |
| C3-2 |  |  |  | — | 7 |
| C3-3 |  |  | — |  | 7 |
| 4 |  |  |  |  | 8 |
| C4-1 |  |  | — | — | 4 |
| C4-2 |  |  |  | — | 4 |
| C4-3 |  |  | — |  | 7 |
| 5 |  |  |  |  | 10 |
| C5-1 |  |  | — | — | 4 |
| C5-2 |  |  |  | — | 7 |
| C5-3 |  |  | — |  | 7 |
| 6 |  |  |  |  | 8 |
| C6-1 |  |  | — | — | 3 |
| C6-2 |  |  |  | — | 4 |
| C6-3 |  |  | — |  | 6 |
| 7 |  |  |  |  | 10 |
| C7-1 |  |  | — | — | 4 |
| C7-2 |  |  |  | — | 6 |
| C7-3 |  |  | — |  | 6 |
| 8 |  |  |  |  | 7 |
| C8-1 |  |  | — | — | 2 |
| C8-2 |  |  |  | — | 4 |
| C8-3 |  |  | — |  | 6 |

COMPARATIVE EXAMPLE C3-4

A crosslinker composition is prepared by dissolving 1285 parts by weight of the styrene allyl alcohol copolymer of Example 1 in 1000 parts by weight of butyl cellosolve. The solution is cooled to 25° C. and 5143 parts by weight of the methoxymethylmelamine of Example 1 and 2572 parts by weight of the epoxy resin of Example 1 are successively added incrementally to avoid clumping and the mixture is stirred until a uniform solution is obtained. A coating composition is then prepared by the procedure of Example 3 using the polyester vehicle of Example 3 to provide the same weight ratio of vehicle to crosslinker of 80:20.

COMPARATIVE EXAMPLE C3-5

A crosslinker composition is prepared by dissolving the ingredients of Example 1 in butyl cellosolve to provide a solution containing the same proportion and concentration of ingredients, the solution being carried out at 30° C., and the order of addition being epoxy, followed by methoxymethylmelamine, followed by styrene allyl alcohol copolymer. A coating composition is then prepared by the procedure of Example 3 using the polyester vehicle of Example 3 to provide the same weight ratio of vehicle to crosslinker of 80:20.

COATING PROPERTIES OF EXAMPLES 3, C3-4 AND C3-5

The pigmented coating compostions of Examples 3, C3-4 and C3-5 are applied to test panels and cured under the conditions set forth hereinabove. The dried coatings are tested for gloss, flexibility and mustard stain resistance. The data are presented in Table 2.

TABLE 2
EFFECT OF METHOD OF PREPARING CROSSLINKER COMPOSITION ON COATING PROPERTIES

| Example | Vehicle | Weight Ratio | 60° Gloss | T-bend Flexibility | Mustard Stain |
|---|---|---|---|---|---|
| 3 | Polyester | 20:80 | 85 | 1T | 10 |
| C3-4 | Polyester | 20:80 | 40 | 3T | 6 |
| C3-5 | Polyester | 20:80 | 80 | 3T | 7 |

I claim:
1. A composition of matter comprising from about 40 to about 70 parts by weight of an etherified amino resin, from about 15 to about 40 parts by weight of an epoxy resin and from about 5 to about 20 parts by weight of a styrene allyl alcohol copolymer, wherein the amino resin is added to a solution of styrene allyl alcohol copolymer the epoxy resin is then added and the mixture is heated to a temperature in the range of 60° to 120° C. until a clear solution is obtained.

2. The composition of claim 1 wherein the amino resin is an etherified methylolmelamine, methylolguanamine or methylolurea etherified with at least one C$_1$ to C$_4$ alkanol and has a degree of polymerization of less than 4.0 and wherein the styrene allyl alcohol copolymer has a molecular weight in the range of about 800 to about 2500 and a hydroxy content in the range of about 4.0 to about 10 weight percent.

3. The composition of claim 2 wherein the amino resin is a methoxy methylolmelamine in which the combined ratio of melamine to formaldehyde to methanol is in the range of about 1:5.5:5.0 to about 1:6.0:6.0.

4. The composition of claim 2 wherein the amino resin is an etherified methylolmelamine etherified with methanol and butanol.

5. The composition of claim 2 wherein the amino resin is an etherified methylolmelamine etherified with methanol and 2-methyl-1-propanol.

6. The composition of claim 2 wherein the epoxy resin is a bisphenol A epichlorohydrin epoxy resin having an equivalent of 1100 or less.

7. A method of manufacturing a crosslinker composition comprising an etherified amino resin, a styrene allyl alcohol copolymer and an epoxy resin wherein the styrene allyl alcohol copolymer is dissolved in a polar solvent, the etherified amino resin is added, the epoxy resin is mixed into the resin blend and the mixture is heated to a temperature in the range of 60° to 120° C. until a clear solution is obtained.

8. The method of claim 7 wherein the etherified amino resin is an etherified methylolmelamine, methylolguanamine or methylolurea etherified with at least one C$_1$ to C$_4$ alkanol and has a degree of polymerization of less than 4.0 and wherein the styrene allyl alcohol copolymer has a molecular weight in the range of about 800 to about 2500 and a hydroxy content in the range of about 4.0 to about 10 weight percent.

9. The method of claim 8 wherein the amino resin is a methoxy methylolmelamine in which the combined ratio of melamine to formaldehyde to methanol is in the range of about 1:5.5:5.0 to about 1:60:60.

10. The method of claim 8 wherein the amino resin is an etherified methylolmelamine etherified with methanol and butanol.

11. The method of claim 8 wherein the amino resin is an etherified methylolmelamine etherified with methanol and 2-methyl-1-propanol.

12. The method of claim 8 wherein the epoxy resin is a bisphenol A epichlorohydrin epoxy resin having an equivalent of 1100 or less.

13. The method of claim 8 wherein the solvent is butyl cellosolve.

14. The method of claim 13 wherein the mixture is heated at 80° to 100° for 10 to 30 minutes.

* * * * *